US012246416B2

(12) United States Patent
Berkovits et al.

(10) Patent No.: US 12,246,416 B2
(45) Date of Patent: Mar. 11, 2025

(54) POSITIONER, GUIDE AND/OR MAGAZINE FOR SCREWS AND NAILS

(71) Applicants: Zuriel Berkovits, Even Shmuel (IL); Eliran Berkovich, Jerusalem (IL)

(72) Inventors: Zuriel Berkovits, Even Shmuel (IL); Eliran Berkovich, Jerusalem (IL)

( * ) Notice: Subject to any disclaimer, the term of this patent is extended or adjusted under 35 U.S.C. 154(b) by 0 days.

(21) Appl. No.: 18/229,697

(22) Filed: Aug. 3, 2023

(65) Prior Publication Data

US 2023/0381933 A1 Nov. 30, 2023

Related U.S. Application Data

(62) Division of application No. 16/675,242, filed on Nov. 6, 2019, now Pat. No. 11,780,065.

(30) Foreign Application Priority Data

Nov. 5, 2019 (IL) .......................................... 270439

(51) Int. Cl.
*B25B 23/10* (2006.01)
*B25B 23/04* (2006.01)
*B25C 3/00* (2006.01)

(52) U.S. Cl.
CPC .............. *B25B 23/10* (2013.01); *B25C 3/006* (2013.01); *B25B 23/04* (2013.01)

(58) Field of Classification Search
CPC ....... B25B 23/005; B25B 23/08; B25B 23/10; B25B 23/101; B25B 23/106; B25C 3/006; F16B 27/00
USPC ................................................ 81/57.37, 452
See application file for complete search history.

(56) References Cited

U.S. PATENT DOCUMENTS

| | | | | |
|---|---|---|---|---|
| 3,812,961 | A | 5/1974 | Merrick et al. | |
| 4,047,611 | A | 9/1977 | Damratowski | |
| 4,526,072 | A | 7/1985 | Manhoff, Jr. | |
| 4,718,551 | A | 1/1988 | Whitledge | |
| 4,998,452 | A * | 3/1991 | Blum | B25B 23/045 206/820 |
| 6,974,030 | B1 | 12/2005 | Sundstrom | |
| 2007/0258793 | A1 | 11/2007 | Sundstrom | |
| 2008/0000942 | A1 | 1/2008 | Sundstrom | |

(Continued)

FOREIGN PATENT DOCUMENTS

| | | | | |
|---|---|---|---|---|
| EP | 0757935 | A1 * | 2/1997 | F16B 27/00 |
| GB | 2464834 | A | 5/2010 | |
| WO | WO2018158762 | A1 | 9/2018 | |

*Primary Examiner* — Eric J Rosen
*Assistant Examiner* — Aaron R McConnell

(57) ABSTRACT

An aspect of some embodiments of the current invention relates to a positioner for holding one or more fasteners (e.g. screws and/or nails) which allows a user to push the fasteners out directly into a target material. For example, a user may locate the positioner over a location on the target material and/or drive the fastener through the positioner into the target. In some embodiments, the positioner includes multiple fasteners, for example the positioner maybe used as a magazine of fasteners and/or a storage box for fasteners. Optionally, the positioner includes a hard frame and/or a soft passage holding the fastener. For example, a fastener is inserted into the top of the passage and driven (e.g. pushed, hammered and/or screwed) through, out the bottom of the passage into the target. Optionally, multiple positioners may be arranged along a guide.

14 Claims, 11 Drawing Sheets

(56) References Cited

U.S. PATENT DOCUMENTS

| | | | |
|---|---|---|---|
| 2018/0065236 | A1 | 3/2018 | Begley |
| 2019/0381616 | A1 | 12/2019 | Cohen |

* cited by examiner

POSITIONER, GUIDE AND/OR MAGAZINE FOR SCREWS AND NAILS

RELATED APPLICATION/S

This application claims the benefit of priority of Israeli Patent Application No. 270439 filed on 5 Nov. 2019. The contents of the above applications are all incorporated herein by reference.

FIELD AND BACKGROUND OF THE INVENTION

The present invention, in some embodiments thereof, relates to a positioner for placing a screw and/or a nail.

SUMMARY OF THE INVENTION

According to an aspect of some embodiments of the invention, there is provided a positioner including: a rigid frame surrounding the positioner on at least three sides; and a flexible interior including at least one vertical through passage sized small enough to connect engage a thread of a screw and elastically expandable to allow passage of head of the screw.

According to some embodiments of the invention, the flexible interior includes a plurality of parallel passages.

According to some embodiments of the invention, a length of the positioner is greater than its height.

According to some embodiments of the invention, a width of the positioner is greater than its height.

According to some embodiments of the invention, the frame includes a bottom having a plurality of holes aligned with the plurality of through passages.

According to some embodiments of the invention, the positioner further includes a guide configured to hold the positioner and a plurality of similar positioners along a straight line.

According to some embodiments of the invention, the positioner further includes an interface for a guide configured to hold the positioner and a plurality of similar positioners in a determined geometric pattern.

According to some embodiments of the invention, the guide includes a cord.

According to some embodiments of the invention, each of the through passages includes at least one chamber and one or more inner directed protrusions.

According to some embodiments of the invention, the each of the inner directed protrusions includes a set of inner directed petals arranged around the passage.

According to some embodiments of the invention, the protrusion has a cross section that tapers toward the center of the passage.

According to some embodiments of the invention, the positioner is configured for attachment to an electric screwdriver.

According to some embodiments of the invention, the positioner further includes a base configured for holding the fastener at a determined angle to a target surface.

According to an aspect of some embodiments of the invention, there is provided a method of driving a fastener into a surface including: providing a positioner including a soft inner core and a through passage; inserting the fastener into the through passage with a point of the fastener facing a bottom opening of the through passage; placing the positioner with the inserted fastener onto the surface with the bottom facing the surface; driving the fastener along the through passage through the soft core into the surface; and removing the positioner from the surface leaving the fastener in the surface.

According to some embodiments of the invention, the fastener includes a screw and wherein the driving includes engaging a thread of the screw to the soft core.

According to some embodiments of the invention, the fastener includes a nail.

According to some embodiments of the invention, the method further includes: arranging in plurality of the positioners along a linear guide and driving a plurality of fasteners through the plurality of positioners to form a line of fasteners through the surface.

According to some embodiments of the invention, the positioner includes a plurality of the through passages and a plurality of the through passages, the method further including: placing the positioner in a second position on the surface and screwing a second screw of the plurality of screws into the surface.

According to some embodiments of the invention, the method further includes, returning of the positioner to a ready state after the removing.

According to some embodiments of the invention, the method further includes inserting a new fastener into the passage after the removing.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
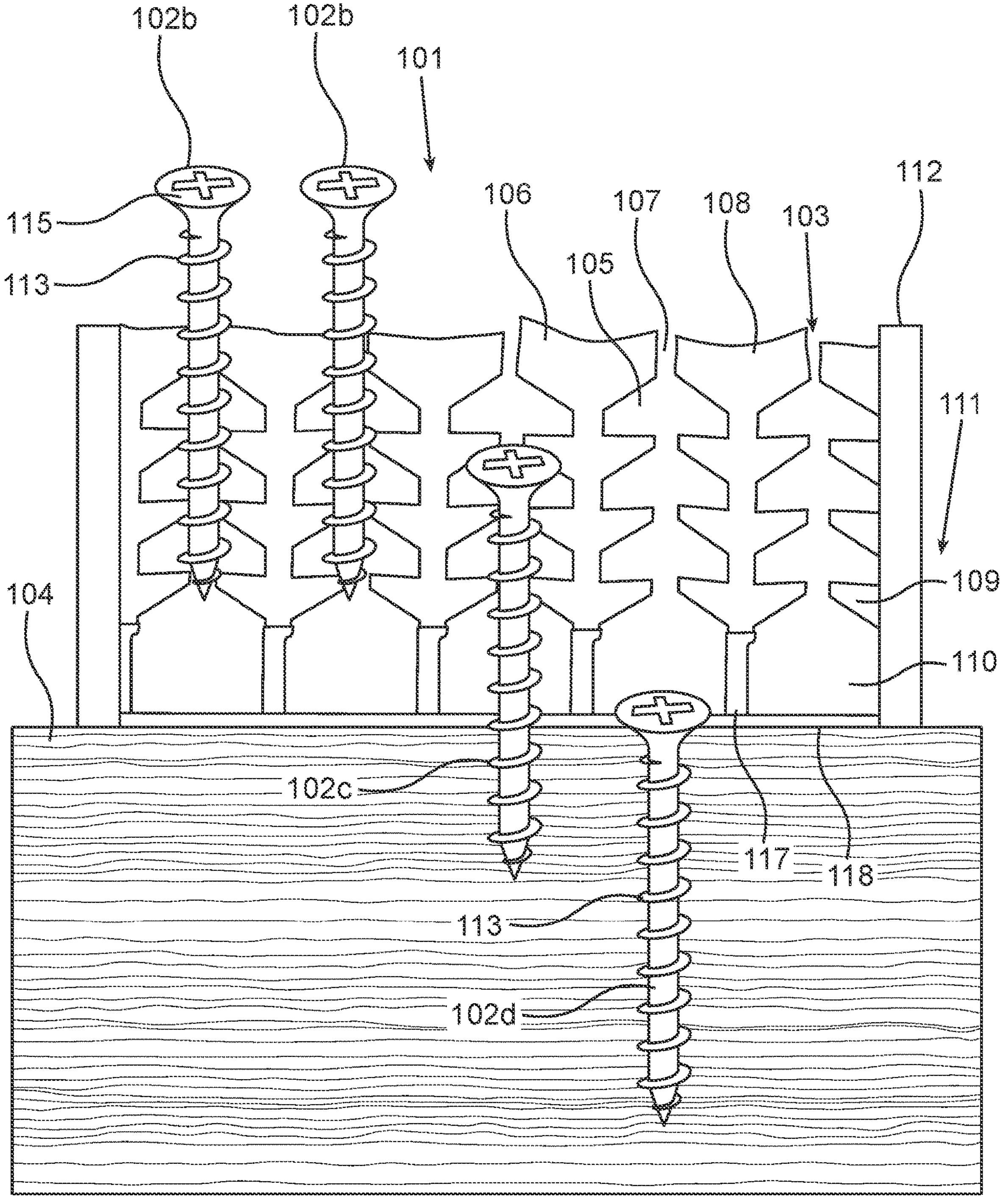
FIG. 1 is a cutaway of a screw magazine in accordance with an embodiment of the current invention.

The present invention, in some embodiments thereof, relates to a positioner for placing a screw and/or a nail.

Overview

An aspect of some embodiments of the current invention relates to a positioner for holding one or more fasteners (e.g. screws and/or nails) which allows a user to push the fasteners out directly into a target material. For example, a user may locate the positioner over a location on the target material and/or drive the fastener through the positioner into the target. In some embodiments, the positioner includes multiple fasteners, for example the positioner maybe used as a magazine of fasteners and/or a storage box for fasteners. Optionally, the positioner includes a hard frame and/or a soft passage holding the fastener. For example, a fastener is inserted into the top of the passage and driven (e.g. pushed, hammered and/or screwed) through, out the bottom of the passage into the target. For example, the rigid frame may surround the soft passage on 2, 3, 4, 5 and/or 6 sides (e.g. with an opening in the $5^{th}$ and/or $6^{th}$ side through which the fastener exits and/or enters).

An aspect of some embodiments of the current invention relates to a method of fastening a target object. In some embodiments, a fastener (e.g. a nail and/or a screw) may be inserted into a positioner. The positioner is optionally be placed over a target surface to be fastened and/or the fastener is driven through the fastener into the target surface. Once the fastener has been driven into the target surface, the positioner is optionally taken away. Optionally, a plurality of a positioners may be aligned to insert a pattern of fasteners (for example a line of positioners may be place along a guide and/or the fasteners may be placed along a line of the surface).

An aspect of some embodiments of the current invention relates to a nail holder. For example, a flexible gripper that grips a nail and hold it upright over a surface for knocking into the surface.

DETAILED EMBODIMENTS

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a cutaway view of a screw positioner in accordance with an embodiment of the current invention. For example, the positioner may include a soft central core 101 surrounded on two or more sides by a rigid frame 111. Optionally, the core 101 includes one or more through passageways 103. Optionally, a fastener (e.g. a screw 102*a*, 102*b*) is stored in some or all of the passages. For example, the screw 102*a*, 102*b* may be partially driven (e.g. screwed) into the top of a passage. Optionally the fastener is deployed by driving the fastener (e.g. screw 102*c*) through the passage 103 into a target surface, for example a block of wood 104. For example, when the fastener (e.g. screw 102*d*) is fully driven into the surface, the positioner is removed leaving the fastener in the target surface.

In some embodiments, the passages 103 are configured to be reusable and/or hold a fastener and/or allow passage of the fastener. For example, the core of the positioner may be made of an elastic material (e.g. silicone and/or a thermostatic elastomer and/or elastomeric plastic (e.g. polyurethane) and/or rubber). The passages may include narrow regions 107 tight enough to grasp the fastener (e.g. engage screw thread 113 of a screw 102*a*-102*d*). Optionally the core is elastic enough for a narrow region 107 of a passage 103 to elastically expand to a allow passage of a wide part of the fastener (e.g. screw head 115). In some embodiments, passageways 103 may include expanded regions 105 and narrow regions 107. Optionally, the expanded regions may have a conical shape and/or may be tapered upward (pointing away from the direction of insertion of the fastener). For example, resistors may protrude into the passage 103. For example, resistors may include leaves 109. Optionally, the leaves 109 may have a tapered shape and/or triangular cross section and/or be tapered upward. Optionally, the resistors may grasp the threads of a screw 102*a*-102*c* while the expanded regions 105 may provide space into which the leaves can fold to allow passage of a wide portion of a fastener (e.g. a screw head 115).

In some embodiments, the top of the rigid frame 111 is open. Optionally, the top leaves 106 of the elastic core 101 are thicker and/or more complete than the lower leaves 109. For example, this may make the top of the positioner appear complete with narrow openings 107. For example, this may make it easier to start driving a screw 102*a*-102*d* into the top of the positioner (for example because the thick leaves 106 engage the screw threads 113. Optionally, the frame includes walls 112. For example, walls 112 may surround the core 101 of the positioner on 1, 2, 3 and/or 4 sides. Alternatively or additionally, the core may include an internal frame (e.g. a skeleton).

Figure 4:
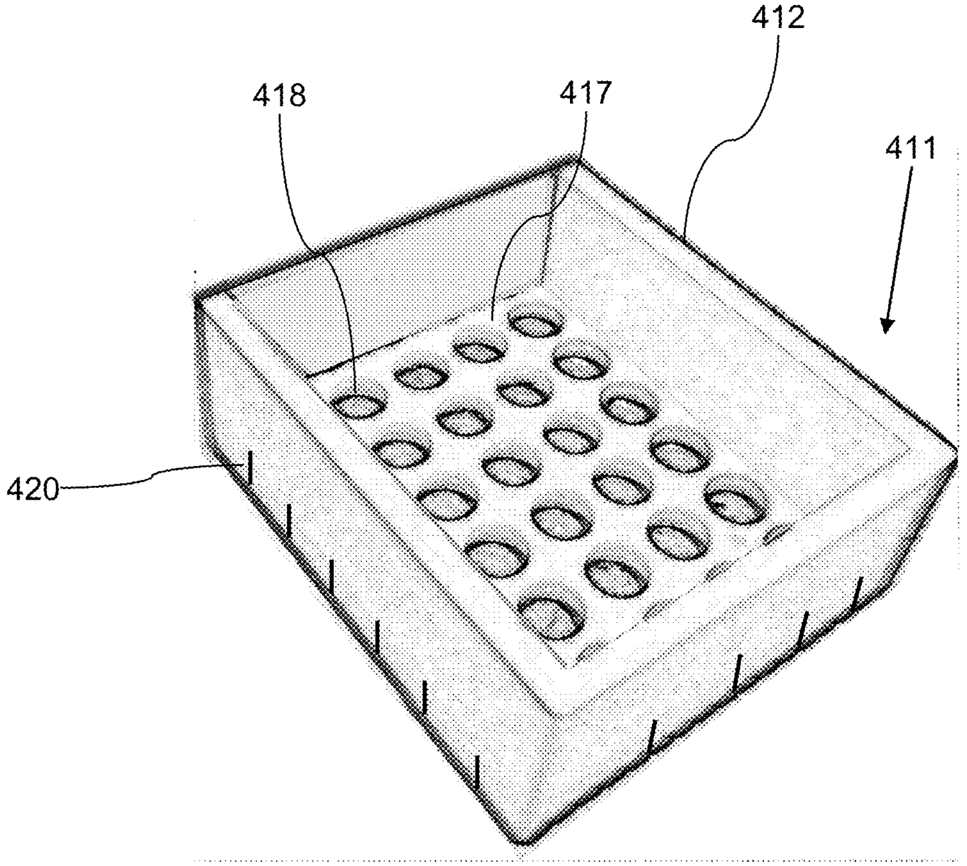
FIG. 4 is a perspective view of a frame of a fastener positioner in accordance with an embodiment of the current invention.

In some embodiments, the bottom of the rigid frame 111 includes dividers 117 and/or openings between the dividers 117 and/or opening 118 between the dividers. For example, dividers 117 may form a bottom of the positioner while openings 118 may comprise openings in the bottom through which the fastener (e.g. screws 102*a*-102*d*) pass into the target surface (for example, as illustrated in FIG. 4). Optionally, at the bottom of each through passage 103, there is an open space 110 (for example right above each opening 118 in the bottom of the frame. The space 110 at the bottom of the passage 103 optionally makes it easier to remove the positioner once the fastener has been driven into the target surface.

Figure 2A:
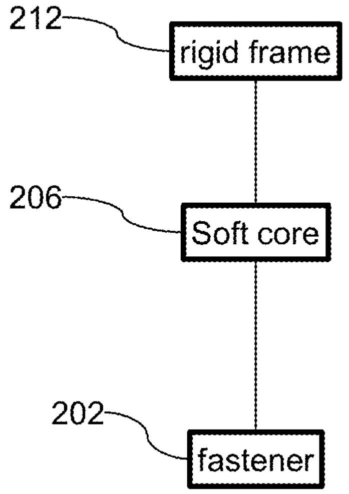
FIG. 2A is a block diagram of fastener positioner in accordance with an embodiment of the current invention.
Figure 2B:
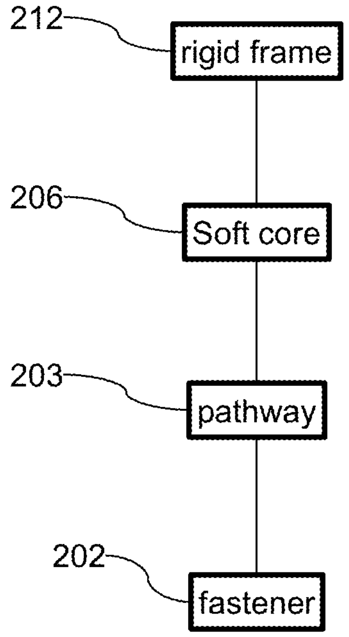
FIG. 2B is a block diagram of fastener positioner in accordance with an embodiment of the current invention.

FIGS. 2A and 2B are block diagrams of fastener positioners in accordance with embodiments of the current invention. In some embodiments, a positioner will have a rigid frame 212 and/or a soft core 206. Optionally, the soft core 206 is configured to hold one or more fasteners 202. For example, a fastener 202 may be partially inserted into core 206 and/or held in place by the core 206. Optionally, the core 206 is configured for driving the faster 202 therethrough. For example, after driving a fastener through the core 206 the core 206 may remain viable for reuse with another fastener. For example, the elasticity of the core 206 may cause it to return to is original state for reuse. For example, the core 206 may include one or more elastic through passageways 203. The fastener 202 may be inserted into the through passageway 203 and/or driven through the through passageway 203. Once the fastener has passed through the passageway 203, the passageway 203 may elastically return to its original state. Optionally, the passageway 203 may have features (e.g. leaves and/or narrow regions and/or widened spaces) that enhance the ability of passageway 203 to retain the fastener and/or return to its original state.

Figure 3:
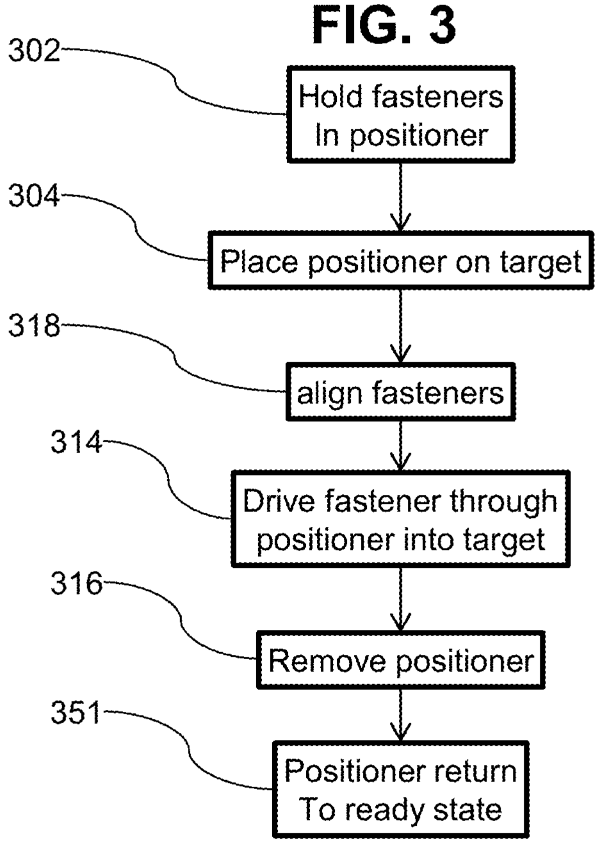
FIG. 3 is a flowchart illustration of a method of positioning a fastener in accordance with an embodiment of the current invention.

FIG. 3 is a flowchart illustration of a method of positioning a fastener in accordance with an embodiment of the current invention. In some embodiments, fasteners are supplied held 302 in a positioner. For example, the fasteners may be partially driven into through passageways of the positioner (e.g. in a soft core thereof). For example, the passageway may have an opening on the top of the positioners. Optionally the fasteners are driven downward through the opening in the top of the positioner.

In some embodiments, the positioner with the fasteners is optionally placed 304 on a target surface. For example, the bottom of the guide may be placed 304 on a target surface. Optionally, the positioner is positioned with a fastener aligned 318 to a location where it is to be driven. In some embodiments, the bottom of the positioner includes an opening out of which the fastener will pass and/or a marking indicating where the fasteners will pass. Optionally, the opening and/or marking is aligned 318 to the location where the fastener is to be driven.

In some embodiments, once the positioner is in position 304 and/or the fastener is aligned 318, the fastener is driven 314 through the positioner into the target surface. For example, driving 314 a screw into a surface may include engaging a screw thread with the positioner (e.g. with the core of the positioner and/or a passage through the core) and/or screwing the screw through the positioner. For example, driving 314 a screw into a surface may include engaging a screw thread with the target surface and/or screwing the screw through the surface. For example, driving 314 a nail into a surface may include pushing and/or hammering the nail through the positioner (e.g. through the core of the positioner and/or through a passage through the core). For example, driving 314 a nail into a surface may include pushing and/or hammering the screw into the surface.

In some embodiments, once the fastener is attached to the target, the positioner may be removed 316, leaving the fastener attached to the surface. For example, a positioner may be removed 316 once the fastener has been driven full through the positioner and/or fully into the surface. Alternatively or additionally, the positioner may be removed when the fastener has been partially driven through the positioner (e.g. when the head of the screw and/or nail is in an open space near the bottom of the positioner and/or has reached a top of the positioner). Optionally, after the positioner is removed 316 the fastener may be fully driven into the surface. Optionally, once the fastener has been removed from the positioner the positioner returns 351 to a ready state to (e.g. receive a new fastener). For example, the soft core elastically returns to its original state.

FIG. 4 is a perspective view of a frame 411 of a fastener positioner in accordance with an embodiment of the current invention. Optionally, the frame 411 is made a rigid material, for example, a thermoplastic. In some embodiments, the frame 411 may include walls 412 surrounding a cavity on four sides. For example, the soft core of the positioner may be positioned on the inside of the cavity. Optionally the top of the frame 411 is open. Optionally the frame includes a bottom 417 including holes 418 through which the fasteners may pass into a target surface. Alternatively or additionally, the bottom of the frame may be open. Alternatively or additionally, the frame may have a top that includes holes through which the fasteners may pass into the core of the positioner.

In some embodiments, a frame 411 may include markings 420. For example, markings 420 may indicate the position of a hole 418 through which a fastener passes into a target. For example, markings 420 may be used to align a fastener with a location where the fastener is to be inserted.

Figure 5:
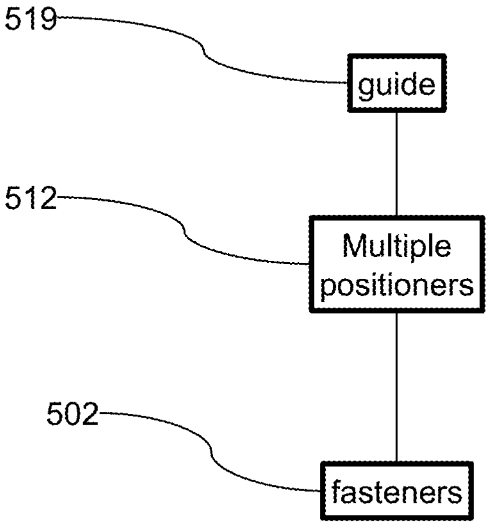
FIG. 5 is a block diagram of a guide for fasteners in accordance with an embodiment of the current invention.

FIG. 5 is a block diagram of a guide for fasteners in accordance with an embodiment of the current invention. In some embodiments, a plurality of positioners 512 may be arranged along a guide 519. For example, the guide may be shaped according to the intended positions of a fasteners 502 on a target surface. For example, a guide 519 may include a line stretched along a panel surface over a position of a stud. Optionally, the guide 519 holds the positioners 512 in a straight line and/or oriented straight into the surface. For example, a worker can attach a line of fasteners 502 by passing along the line of positioners 512 and driving in the fasteners 502 that are already correctly positioned on the surface.

Figure 6:
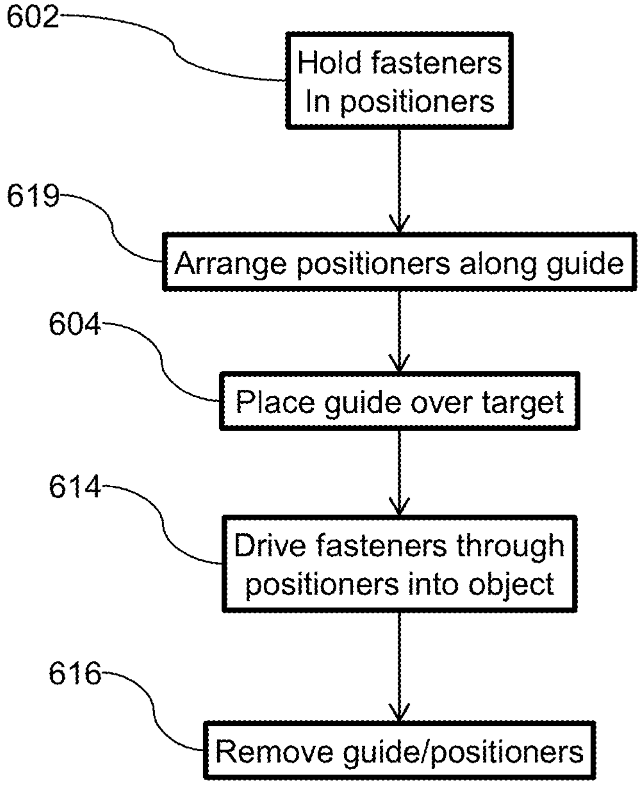
FIG. 6 is a flowchart illustration of a method of positioning a multiple fasteners in accordance with an embodiment of the current invention.

FIG. 6 is a flowchart illustration of a method of positioning multiple fasteners in accordance with an embodiment of the current invention. In some embodiments, a plurality of fasteners is held 602 by a plurality of positioners. Optionally, the positioners are arranged 619 along a guide. For example, the guide may be a flexible (for example a cord) and/or rigid (for example a template). For example, a template may be shaped to place fasteners 602 in standard positions for a repeated job (for example placing a back panel onto a standard sized bookshelf and/or a top onto a standard sized closet etc.). Optionally, the guide is placed 604 over a target surface, automatically positioning the fasteners 602 in the correct positions and/or orientations to be driven into the surface. For example, a cord may be stretched between posts and/or around posts along lines of connection (for example over studs and/or along a seam). For example, a template may be placed 604 on a surface. Optionally, with the guide in position, the fasteners can be driven 614 into the surface and/or the guide removed 616 leaving the fasteners in place.

Figure 7:
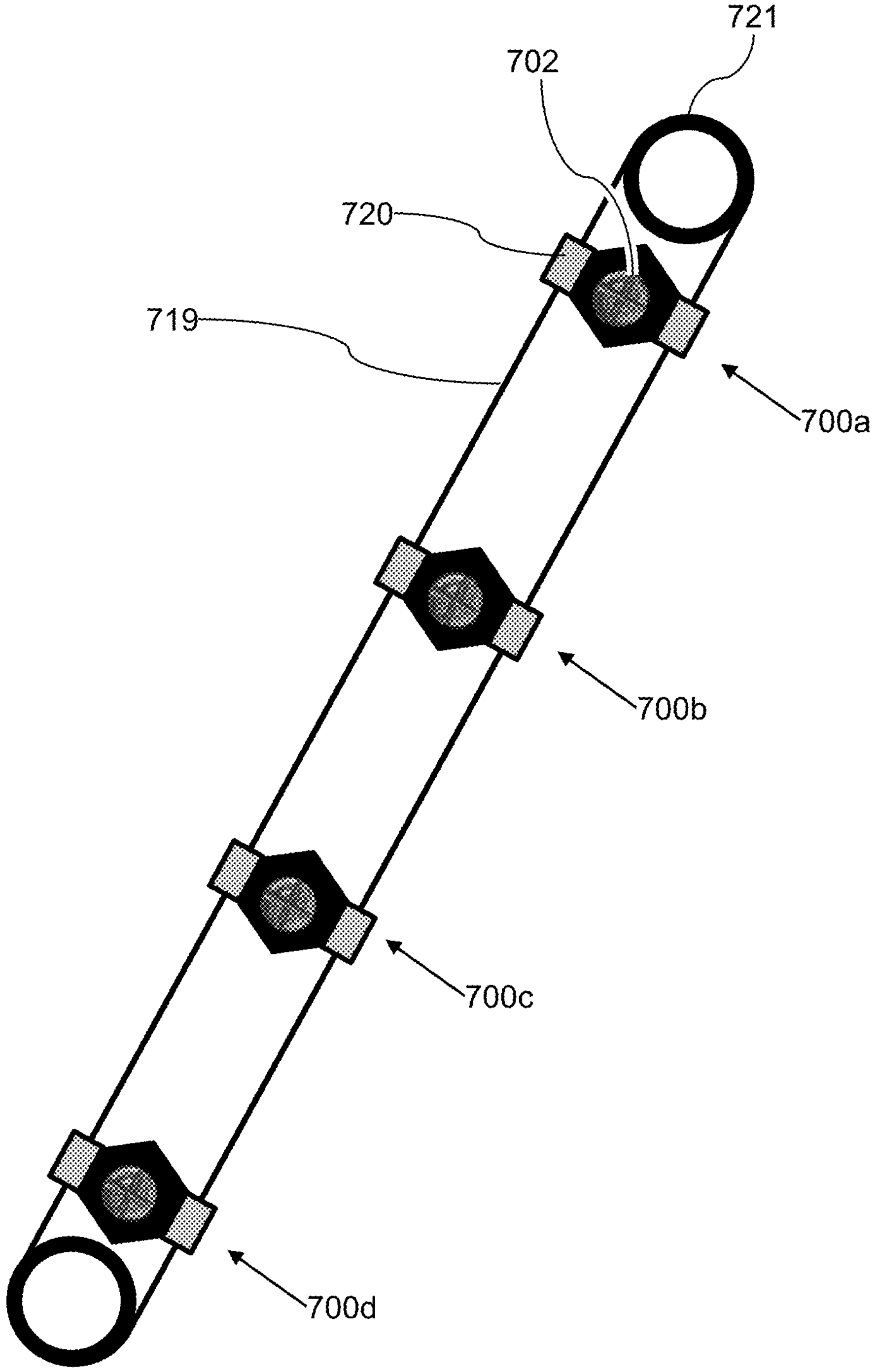
FIG. 7 is a schematic illustration of a guide and positioners in accordance with an embodiment of the current invention.

FIG. 7 is a schematic illustration of a guide and positioners in accordance with an embodiment of the current invention. For example, a plurality of positioners 700*a* to 700*d* may arranged along a guide 719. For example, the guide may include a loop of elastic cord. Optionally the guide is positioned over a surface, for example using marker. For example, a marker may include a post 721. Alternatively or additionally, one or more of the fasteners 702 and/or positioners 700*a*-700*d* may hold the guide 719 in position and/or mark a position on the surface to be fastened. For example, the elastic loop may be stretched over two posts 721 automatically locating the positioners 700*a*-700*d* along a line between the posts 721. Optionally, a positioner 700*a* may include an interface 720 to the guide 719. For example, an interface 720 may include a hole through which a string is strung and/or a friction wheel that measures distance along the string. A clip or clamp or the like may be used to hold the interface in a fixed place along the guide. Alternatively or additionally, the guide 719 may include graduations for positioning positioners along the guide. For example, a guide 719 may include a toothed cord and/or a cord with evenly spaced knots and/or other graduation. For example, a guide and/or a template may include a metal bar with graduations scratched therein. Optionally the graduations may be evenly spaced and/or positioned at strategic locations where a fastener 702 is likely to be positioned. In some embodiments, each positioner includes a frame and/or a soft core, for example as illustrated in various embodiments illustrated herein. In some embodiments, some or all of positioners 700*a*-700*d* may hold and/or position more than one fastener 702.

Figure 8A:
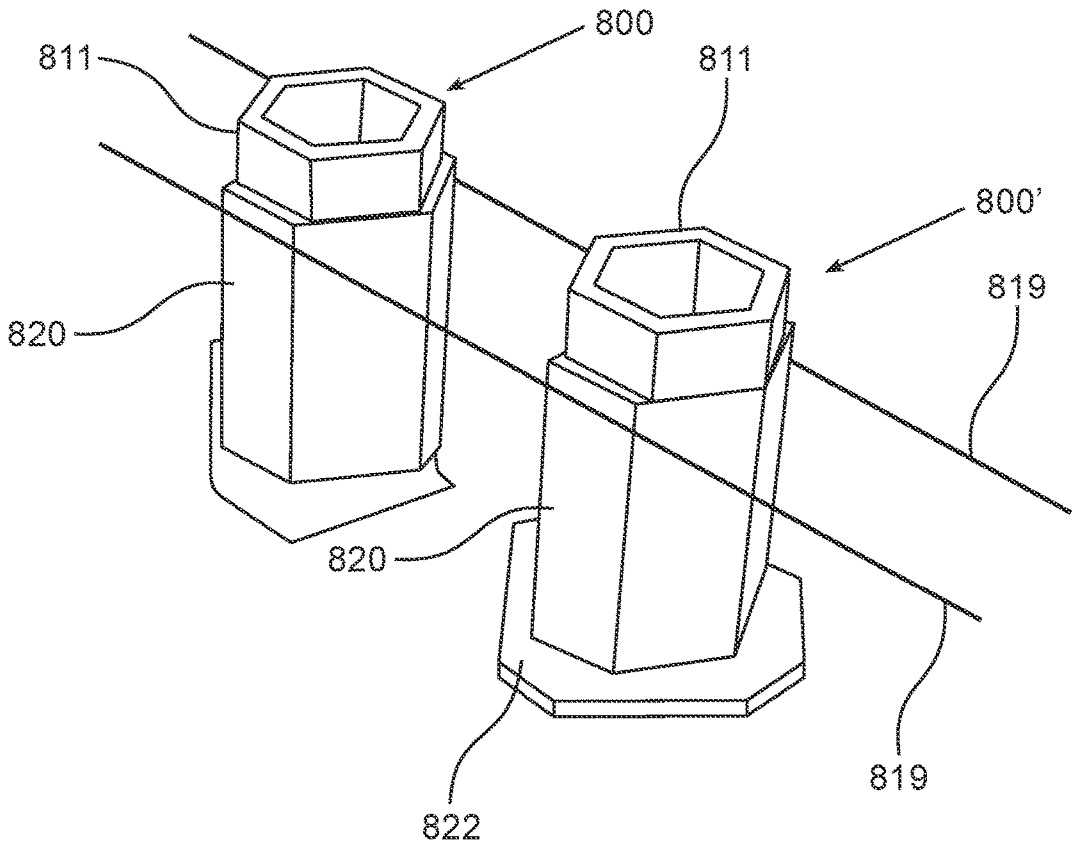
FIG. 8A is a perspective side view of a guide for fasteners in accordance with an embodiment of the current invention.
Figure 8B:
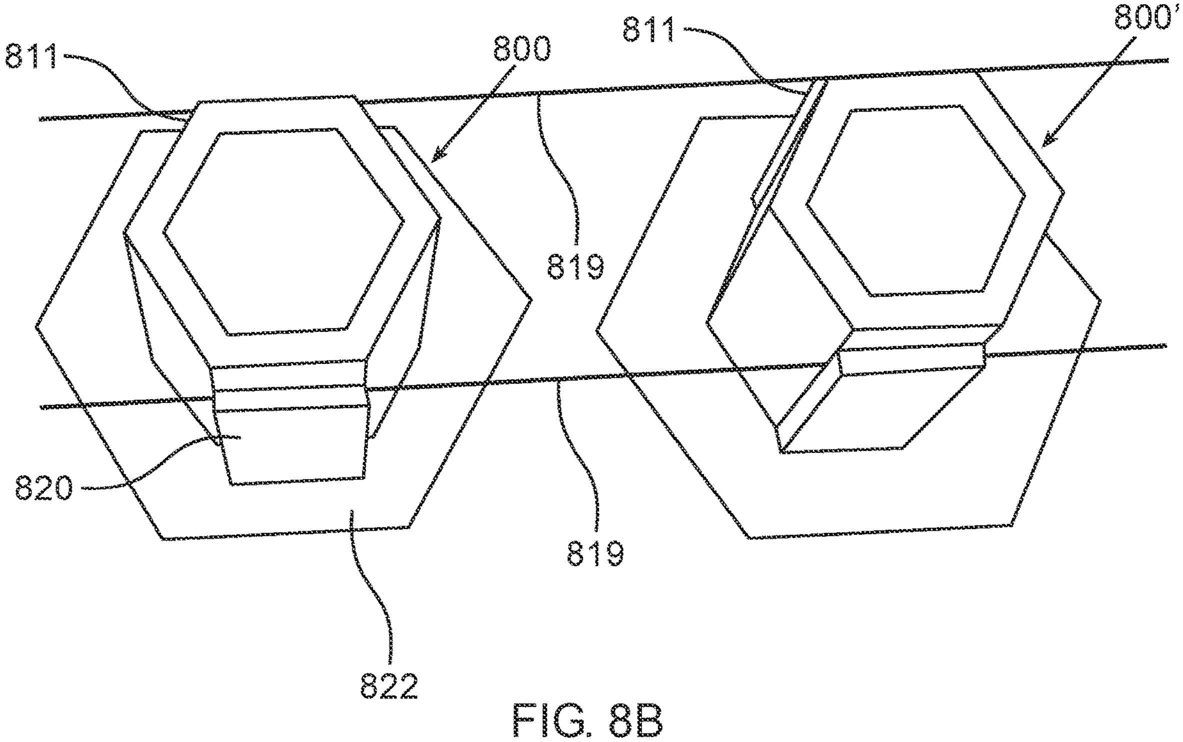
FIG. 8B is a perspective top view of a guide for fasteners in accordance with an embodiment of the current invention.

FIGS. 8A and 8B are a perspective side and top views of a guide and positioners for fasteners in accordance with an embodiment of the current invention. For example, a plurality of positioner 800, 800' may be arranged along one or more guides 819. Optionally, each positioner 800, 800' may include an interface 820 for guide 819. For example, interface 820 may include a wing protruding from a frame 811 of the positioner 800, 800'. Optionally, each positioner 800, 800' includes a soft core (for example similar to core 101 of FIG. 1 optionally including a single through passage 103 for a positioning a single fastener). Optionally, each positioner includes a base 822 and/or a bottom. For example, the base 822 may be configured to orient the positioner 800, 800' and/or a fastener properly over a target surface for driving the fastener into the surface. For example, positioners 800, 800' may be used as described in FIGS. 5, 6, 7 and/or their accompanying descriptions.

Figure 9:
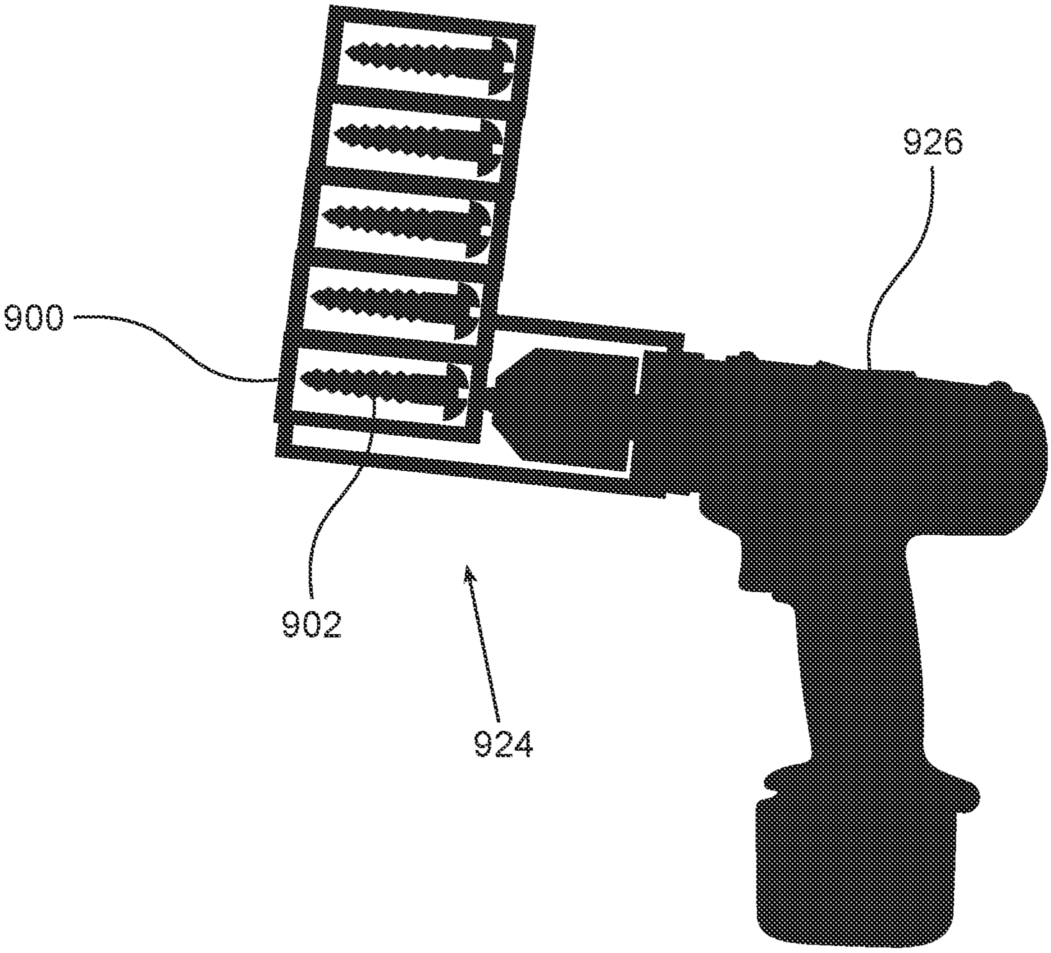
FIG. 9 is a schematic illustration of a positioner connected to an electric screwdriver in accordance with an embodiment of the current invention.

FIG. 9 is a schematic illustration of a positioner connected to an electric screwdriver in accordance with an embodiment of the current invention. In some embodiments, a plurality of fasteners 902 may be stored in one or more positioners 900 included in a magazine 924 of an automatic screw driver 926. For example, a user may place a positioner 900 on a target surface and/or drive a screw 902 into the surface with the screwdriver 926. Optionally, when a screw has been driven out of a positioner 900, the user may manually replace the empty positioner 900 with another one. For example, that may be a lever and/or a knob that advances a set of positioners 900. Alternatively or additionally, the magazine 924 may contain a single positioner 900 and/or after driving in a fastener, the user may take away the empty positioner and/or attach a new positioner. Alternatively or additionally, the magazine 924 may automatically move a new full positioner 900 to replace an empty positioner 900. Alternatively or additionally, the magazine may have one positioner and/or a after driving a first fastener the positioner may be reloaded with a new fastener. Optionally, the positioner may be reloaded. Reloading the positioner may be by an automatic mechanism and/or manually.

Figure 10:
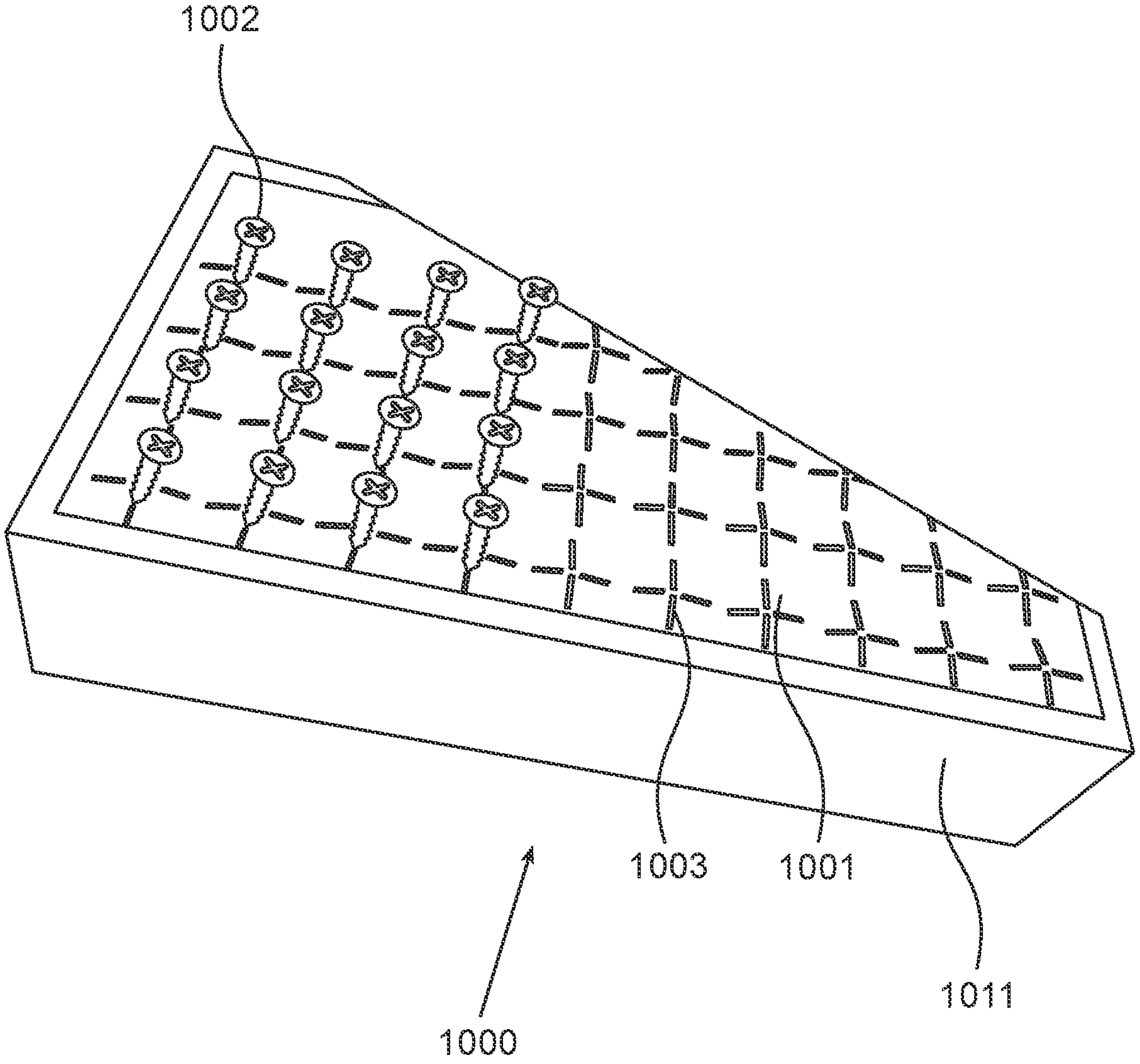
FIG. 10 is a top perspective view of a screw magazine in accordance with an embodiment of the current invention.

FIG. 10 is top perspective view of a screw magazine in accordance with an embodiment of the current invention. In some embodiments, a fastener positioner holds a plurality of screws and/or simultaneously serves as a box to carry fasteners and/or as a positioning device. For example, positioner 1000 is shown with a grid of 5 rows and 10 columns of through passageways 1003. Each passageway 1003 is configured to hold a fastener (e.g. a screw 1002). For example, in the example of FIG. positioner 1000 is holding 16 identical screws 1002. Optionally, some of all of the passages 1003 may contain the same or different fasteners (e.g. large and/or small screws and/or nails).

In some embodiments a fastener positioner 1000 includes a rigid outer frame 1011 and/or a soft core. Optionally, the cross section of the core may include through passageways 1003 (a cross section of an exemplary passageway is illustrated in FIG. 1).

Figure 11:
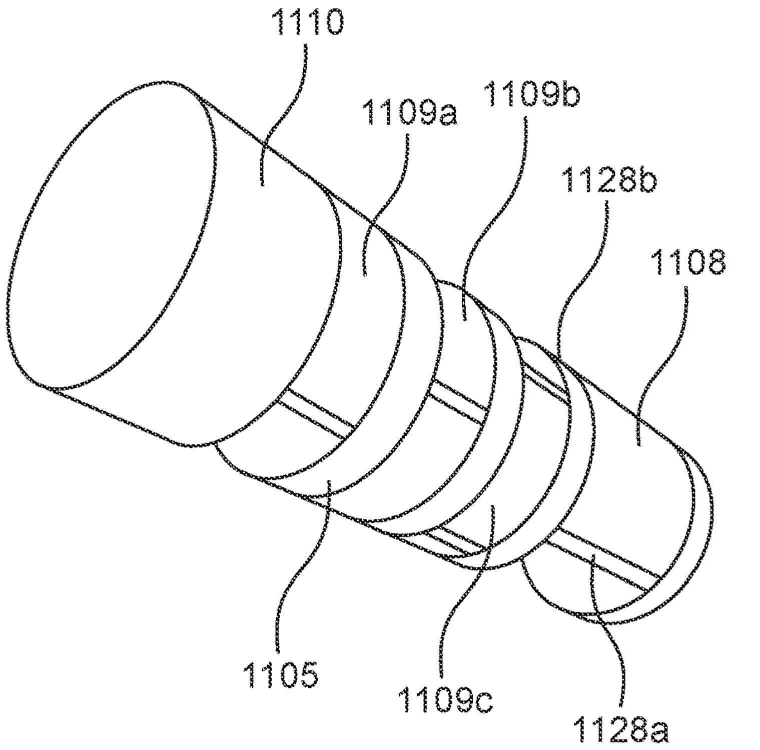
FIG. 11 is a perspective view of a mold for a large passage in accordance with an embodiment of the current invention.

FIG. 11 is a perspective view of an insert mold 1100 for a large passage in accordance with an embodiment of the current invention. For example, mold 1100 may be used to mold the soft core of positioner 800. For example, mold 1100 would be placed inside of the rigid frame 811 and an elastomeric resin injected into the hollow of the frame 811 around mold 811. Mold 1100 is optionally snapped out of frame 800, for example the elastomeric core may be elastic enough to allow the molded undercuts (e.g. leaves 108 and 109) to be stripped from the mold 1100. For example, insert mold 1100 produces a passageway 103 as illustrated in FIG. 1. For example, indentation 1108 in the mold produces the large open leaves 108 at the top of the core. For example, the three smaller indentations 1109*a*, 1109*b* and 1109*c* form the three smaller sets of leaves 109. For example, the large protrusion 1110 on mold 1100 produces a large open space (e.g. space 110 at the bottom of the passageway 103). For example, three layers of protrusions 1105 on the mold 1111 form three levels of spaces 105 in the core 101. Optionally dividers 1128*a* and 1128*b* in the large indention 1108 and small indentations 1109*a*-1109*c* respectively produce radial gaps in leaves 1108 and/or 1109 respectively. Optionally, the radial gaps increase the suppleness of leaves 1108 and/or 1109. In some embodiments, consecutive rows of dividers 1128*b* are angularly offset from each other such that the gaps in consecutive layers of leaves are not aligned. In some embodiments, this gives good gripping of the fastener while preserving the suppleness of the leaves 109.

Figure 12:
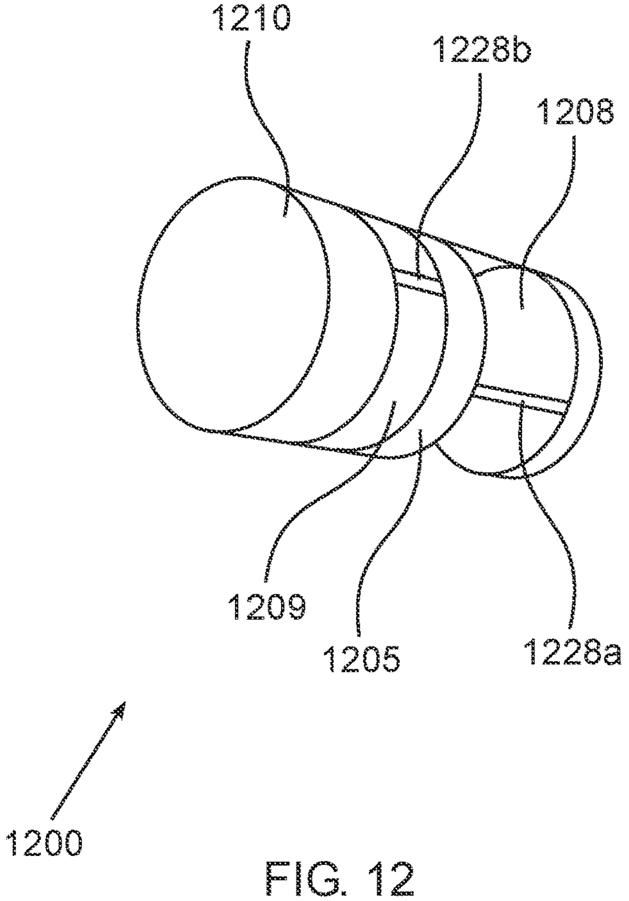
FIG. 12 is a perspective view of a mold for a small passage in accordance with an embodiment of the current invention.

FIG. 12 is a perspective view of an insert mold 1200 for a small passage in accordance with an embodiment of the current invention. Optionally, a smaller insert mold 1200 may fit into a smaller positioner. For example, mold 1200 includes on small indentation 1209 and one large indentation 1208. For example, mold 1200 includes staggered dividers 1228*a*, 1228*b* for example producing leaves with staggered gaps. Optionally mold 1200 includes a large protrusion 1210 and a small protrusion 1205 and a large protrusion 1210, for example producing a large space and/or a small space.

Figure 13A:
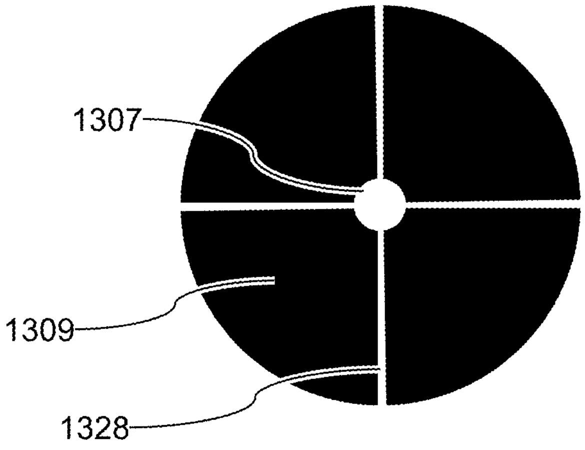
FIG. 13A is a schematic illustration of leaves of a passage in accordance with an embodiment of the current invention.
Figure 13B:
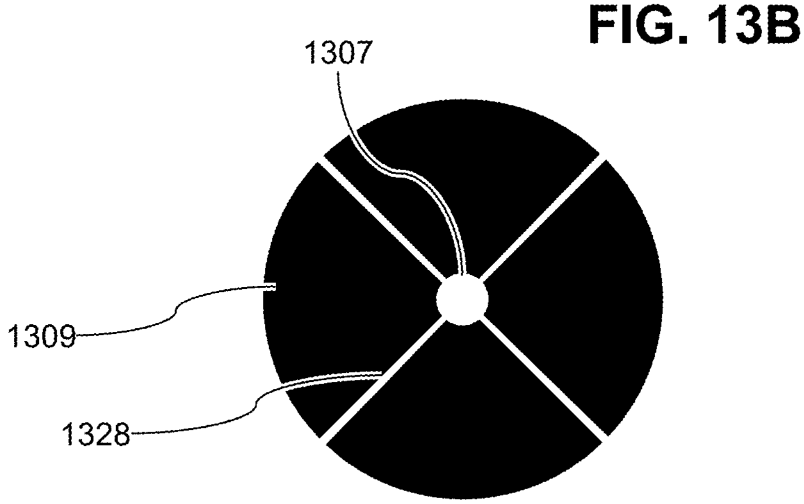
FIG. 13B is a schematic illustration of leaves of a passage in an alternative orientation in accordance with an embodiment of the current invention.

FIGS. 13A and 13B are schematic direct overhead view illustrations of consecutive leaves of a passage in accordance with an embodiment of the current invention. For example, each layer of leaves 1309 may include a narrow through passage 1307 that passes all the way through the core. For example, each layer of leaves 1309 may include one or more (for example four) gaps 1328 allow different portions of the leave to fold independently. The gaps may offset so that a under a gap in a higher layer is an unbroken section of a leaf in a lower layer.

Figure 14A:
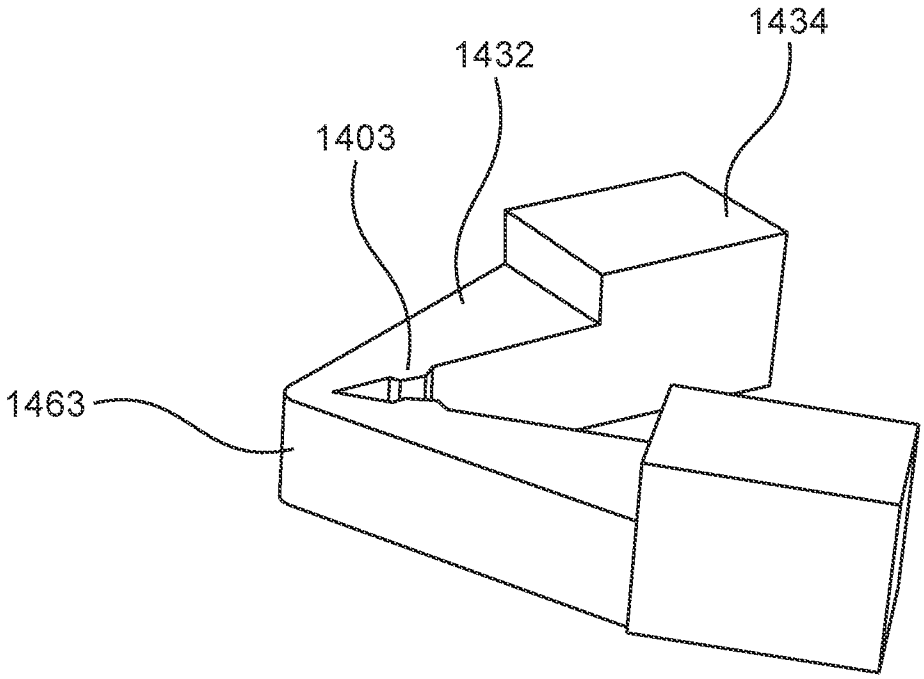
FIG. 14A is a schematic illustration of a nail holder in accordance with an alternative embodiment of the current invention.
Figure 14B:
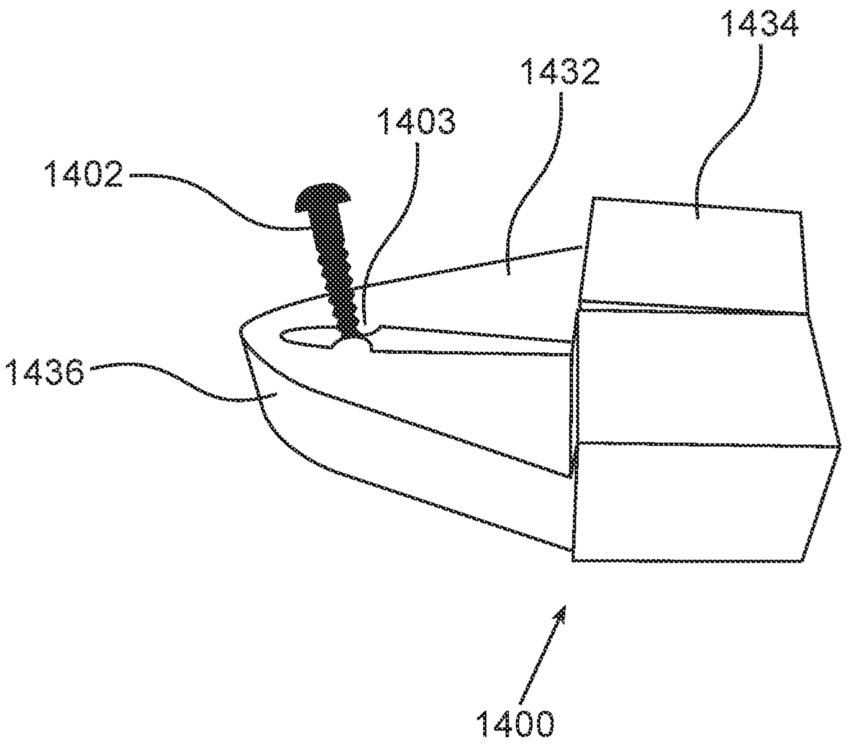
FIG. 14B is a schematic illustration of a nail holder holding a nail in accordance with an alternative embodiment of the current invention.

FIGS. 14A and 14B are a schematic illustrations of a fastener holder in accordance with an embodiment of the current invention. In FIG. 14B, fastener holder 1400 is shown holding a nail 1402. Alternatively or additionally, holder 1400 may be used to hold a screw. In some embodiments, holder 1400 includes a hinge 1463 around which opposing sides of a gripper section 1403 rotate to in one direction to grip and/or around which opposing sides of a gripper section 1403 rotate in an opposite direction to release.

In some embodiments, hinge 1436 is an elastic connection between two sides of the gripper section 1403. Optionally the gripping surfaces of gripping portion 1403 and/or hinge 1436 are all a continuous piece of elastic material. Optionally the holder 1400 also includes a handle section 1434. For example, the handle section includes a thickened portion of said elastic material. Alternatively or additionally, various portions of the gripper 1400 may be made of a rigid material (e.g. metal and/or hard plastic). For example, hinge 1436, handle section 1434 and/or a shank 1432 of the gripper 1400 may be made of a rigid material. For example, the gripper may have a rigid frame and/or a soft inner gripper.

In some embodiments, a base of a holder 1400 is flat. Optionally, rotation of the sides of the gripper section 1403 around the hinge 1436 is parallel to said base. Optionally the gripper section 1403 projects upwardly from the base less than the height of a fastener (for example less than 3 mm and/or between 2 mm to 1 cm and/or between 1 to 3 cm). Optionally, a handle section 1434 projects upward higher than said gripper section 1403 for example between less than 3 mm and/or between 2 mm to 1 cm and/or between 1 to 3 cm more than said gripper section 1403. Optionally the holder includes two arms, each arm including one side of said gripper section 1403. Optionally, said griper section 1403 includes a side on each said arm between said hinge 1436 and said handle section 1434. Optionally, the hinge 1436, gripper section 1403 and handle 1434 comprise one piece of elastic material. For example, a distance of said gripper section 1403 from said hinge 1436 may range between 0.1 to 1 mm and/or between 1 to 3 mm and/or between 3 mm to 1 cm and/or between 1 to 4 cm. For example, a distance of said gripper section 1403 from said hinge 1436 may range between 0.1 to 1 cm and/or between 1 to 3 cm and/or between 3 cm to 10 cm and/or between 1 to 4 cm. For example, the fastener may be grasped by pushing together the handle section 1434 to close the gripper section 1403 on the faster. Alternatively or additionally, said holder 1400 includes an outer frame of a rigid material. In some embodiments, said holder 1400 is biased closed for holding a fastener. Alternatively or additionally, said holder 1400 is biased open for releasing a fastener.

In some embodiments, a base of said holder 1400 is placed on a target surface. Optionally, a fastener 1402 is held in said gripper section 1403 with a long axis perpendicular to said base and driven into the surface. Once the fastener 1403 is partially driven into the surface the gripper 1400 is optionally released leaving the fastener 1402 in the surface.

It is expected that during the life of a patent maturing from this application many relevant technologies will be developed and the scope of the terms are intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A system for positioning a screw comprising: a flexible core formed of a single molded piece of elastomer and including, a plurality of vertical passages passing through said flexible core; wherein each respective passage of said plurality of vertical passages is defined by a vertical extending wall of said flexible core; and wherein a set of inner directed protrusions formed in the elastomer for each respective passage of said plurality of vertical passages, wherein each protrusion of said set of inner directed protrusions has a triangular cross section in a vertical plane extending from a respective vertical passage wall and tapering towards the center of the respective vertical passage to engage a thread of the screw and wherein said triangular cross section is defined by the outer edge of said vertical passage wall, a horizontal top surface of said protrusion, and bottom surface of said protrusion; and wherein bases of said set of inner directed protrusions formed at the outer edge of said respective passage vertical wall are interconnected to surround the passage and wherein said flexible core is elastic enough for each said plurality of vertical passages to return to its original state and remain viable for reuse after expanding to allow passage of a head of said screw.

2. The system of claim 1, wherein a length of said core is greater than its height.

3. The system of claim 2, wherein a width of said core is greater than its height.

4. The system of claim 1, further comprising: a rigid frame surrounding the core on at least three sides.

5. The system of claim 1, further including a rigid bottom having a plurality of holes aligned with said plurality of through passages.

6. The system of claim 1, including a plurality of said flexible cores, each of said flexible cores having an interface to a guide configured to hold a plurality of said flexible cores along a straight line.

7. The system of claim 1, including a plurality of said flexible cores, each of said plurality of said flexible cores having an interface to a guide configured to hold a plurality of said flexible cores in a determined geometric pattern.

8. The system of claim 7, wherein said guide includes a cord.

9. The system of claim 1, wherein said each of said inner directed protrusions comprises an inner directed petal.

10. The system of claim 9, wherein each said inner directed petals is connected to the core at an outer radial edge of the passage and unsupported at the center of the passage.

11. The system of claim 1, wherein the flexible core is configured for attachment to an electric screwdriver.

12. The system of claim 1, further comprising a base of the flexible core configured for holding said core at a determined angle to a target surface.

13. The system of claim 1, wherein said passage is longitudinally symmetric.

14. The system of claim 1, wherein said passage is longitudinally uniform.

* * * * *